(12) United States Patent
Flynn

(10) Patent No.: US 7,588,396 B2
(45) Date of Patent: Sep. 15, 2009

(54) END MILL

(75) Inventor: Clifford Flynn, Pittsfield, MA (US)

(73) Assignee: Berkshire Precision Tool, LLC, Pittsfield, MA (US)

( * ) Notice: Subject to any disclaimer, the term of this patent is extended or adjusted under 35 U.S.C. 154(b) by 0 days.

(21) Appl. No.: 11/684,341

(22) Filed: Mar. 9, 2007

(65) Prior Publication Data

US 2008/0219782 A1 Sep. 11, 2008

(51) Int. Cl.
*B23C 5/10* (2006.01)

(52) U.S. Cl. .............................. 407/54; 407/61; 407/34; 407/53

(58) Field of Classification Search .................. 407/30, 407/34, 53, 54, 56, 57, 60–63
See application file for complete search history.

(56) References Cited

U.S. PATENT DOCUMENTS

| | | | |
|---|---|---|---|
| 3,003,224 A * | 10/1961 | Ribich | 407/54 |
| 5,049,009 A | 9/1991 | Beck et al. | |
| 5,176,476 A * | 1/1993 | Duffy et al. | 407/63 |
| 5,913,644 A | 6/1999 | DeRoche et al. | 5/20 |
| 6,105,467 A | 8/2000 | Baker | 76/104.1 |
| 6,976,811 B1 | 12/2005 | DeRoche et al. | 5/20 |
| 6,991,409 B2 | 1/2006 | Noland | 407/63 |
| 6,997,651 B2 | 2/2006 | Kawai et al. | 407/53 |
| 7,306,408 B2 * | 12/2007 | Wells et al. | 407/53 |
| 2001/0051076 A1 * | 12/2001 | Kunimori et al. | 407/35 |
| 2002/0090273 A1 | 7/2002 | Serwa | 5/10 |
| 2006/0045637 A1 * | 3/2006 | Flynn | 407/53 |
| 2006/0045638 A1 * | 3/2006 | Flynn | 407/53 |
| 2008/0199265 A1 * | 8/2008 | Hamatake et al. | 407/54 |

FOREIGN PATENT DOCUMENTS

WO   WO 2006/046278   5/2006

* cited by examiner

*Primary Examiner*—Boyer D Ashley
*Assistant Examiner*—Sara Addisu
(74) *Attorney, Agent, or Firm*—O'Shea Getz P.C.

(57) ABSTRACT

An end mill is provided having an axis of rotation, a shank section and a fluted section, each extending along the axis of rotation, and a plurality of helical teeth. The fluted section has a first end attached to the shank section and a second end. The plurality of helical teeth is disposed within the fluted section. Each helical tooth has a cutting edge, a relief surface, a cutting surface, and an edge preparation surface. The edge preparation surface is contiguous with the cutting edge of the respective tooth.

16 Claims, 5 Drawing Sheets

END MILL

BACKGROUND OF THE INVENTION

1. Technical Field

The present invention relates to end mills in general, and to end mill cutting edge geometries in particular.

2. Background Information

A conventional end mill operable to remove material from a workpiece typically includes a shank section and a fluted section. The fluted section includes a plurality of helical teeth, each having a cutting surface and a relief wall that intersect with one another to form a cutting edge. The cutting edges of the rotating end mill engage the workpiece and cause "chips" of the workpiece to separate.

The geometry of the helical teeth, and in particular the cutting edge, greatly influences the performance and life of the tool, and the workpiece finish produced by the tool. The cutting edge of a helical tooth has historically been created by grinding the cutting surface and the relief wall of the tooth, leaving a surface finish typically in the range of between eight and sixteen microns (8-16 µm). Although a surface finish in the range of 8-16 µm is relatively smooth to the naked eye, it contains a plurality of peaks and valleys that will give the cutting edge a serrated-type finish. It is our experience that such a serrated cutting edge can undesirably influence the performance of an end mill by making it more susceptible to undesirable chatter, and negatively affect the life of the tool by making the cutting edge more prone to mechanical failure; e.g., chipping. In addition, a serrated cutting edge can also undesirably limit the smoothness of the workpiece surface finish produced by the tool.

It is known to modify a cutting edge by placing a wire brush in contact with the cutting edge. Modifying a cutting edge in this manner does not, however, produce a uniform cutting edge and therefore does not resolve the aforesaid performance, durability, and finish issues associated with the cutting edge.

What is needed, therefore, is an end mill having helical teeth that provides improved performance, durability and finish characteristics relative to existing end mills.

SUMMARY OF THE INVENTION

According to the present invention, an end mill is provided having an axis of rotation, a shank section and a flute section, each extending along the axis of rotation, and a plurality of helical teeth. The flute section has a first end attached to the shank section, and a second end. The plurality of helical teeth is disposed within the flute section. Each helical tooth has a cutting edge, a relief surface, a cutting surface, and an edge preparation surface. The edge preparation surface is contiguous with the cutting edge of the respective tooth.

An advantage of the present invention end mill is that the improved cutting edge provided by the edge preparation favorably affects the surface finish of the workpiece produced by the tool.

Another advantage of the present invention end mill is that the improved cutting edge provided by the edge preparation makes the tool less susceptible to undesirable chatter.

Another advantage of the present invention end mill is that the improved cutting edge provided by the edge preparation also helps to prevent chipping of the cutting edges and thereby increases the durability of the tool.

Another advantage provided by the present invention end mill is that improved performance and durability are provided in a cost effective manner. The edge preparation surface(s) of the present invention end mill provides improved performance and durability without incurring the cost of creating a fine surface finish to the entirety of the cutting surface and/or relief wall.

These and other objects and advantages will become more readily apparent from the more detailed discussion of the preferred embodiment taken in conjunction with the drawings wherein similar elements are identified by like numerals through several views.

DETAILED DESCRIPTION OF THE INVENTION

Figure 1:
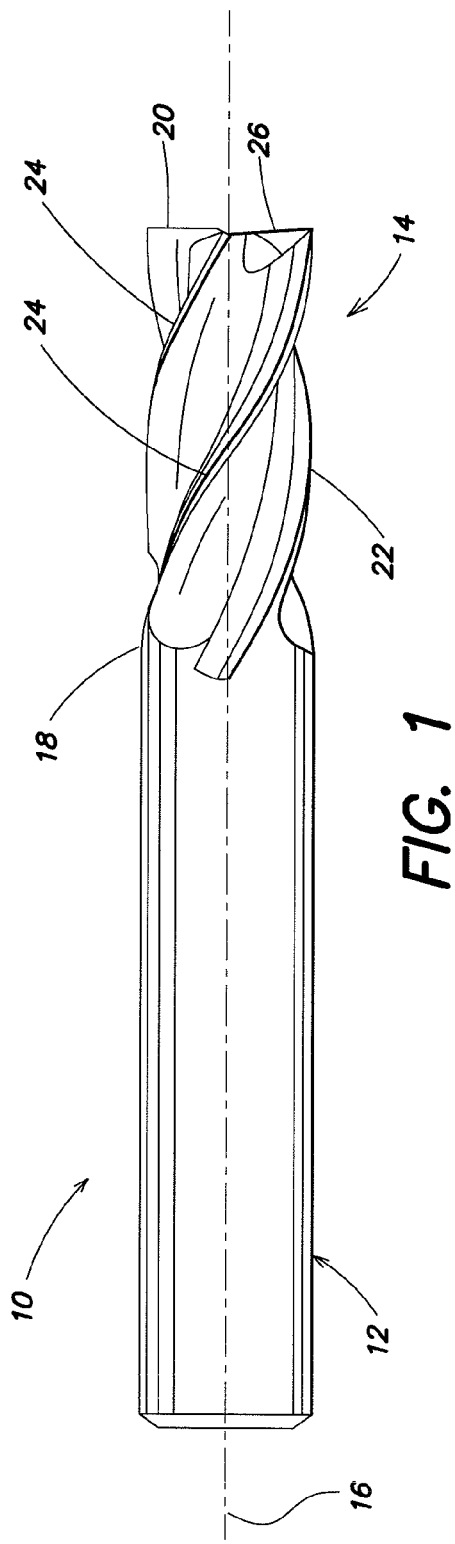
FIG. 1 is a diagrammatic view of an end mill.

Now referring to FIG. 1, an end mill 10 is shown that includes a shank section 12 and a fluted section 14, extending along an axis of rotation 16. The shank section 12 is cylindrical and may include one or more grooves cut into its outer surface to facilitate retention of the end mill within the rotary driven apparatus (e.g., a milling machine). Acceptable end mill materials include high strength steel/cobalt, ceramics, carbides, etc.

The fluted section 14 of the end mill has a first end 18 integrally attached to the shank section 12, a second end 20 (also referred to as the "tip"), and an outer surface 22. A plurality of helical teeth 24 is disposed along the outer surface 22 of the fluted section 14. Each helical tooth 24 includes a tip cutting edge 26 that engages the workpiece when the end mill 10 is plunged into the workpiece. The tip cutting edges 26 are typically disposed at an angle relative to the rotational axis 16 of the end mill 10 to create a relief that facilitates chip removal.

Figure 2:
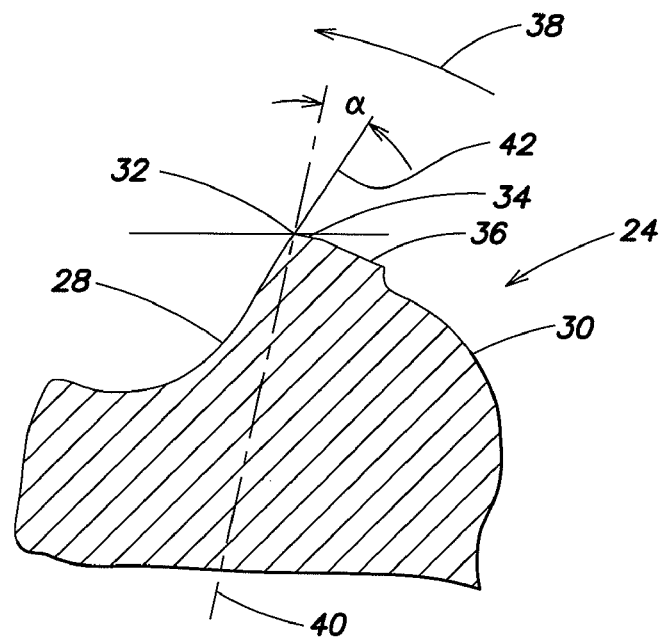
FIG. 2 is a diagrammatic sectional view of a helical tooth with a negative rake angle.
Figure 3:
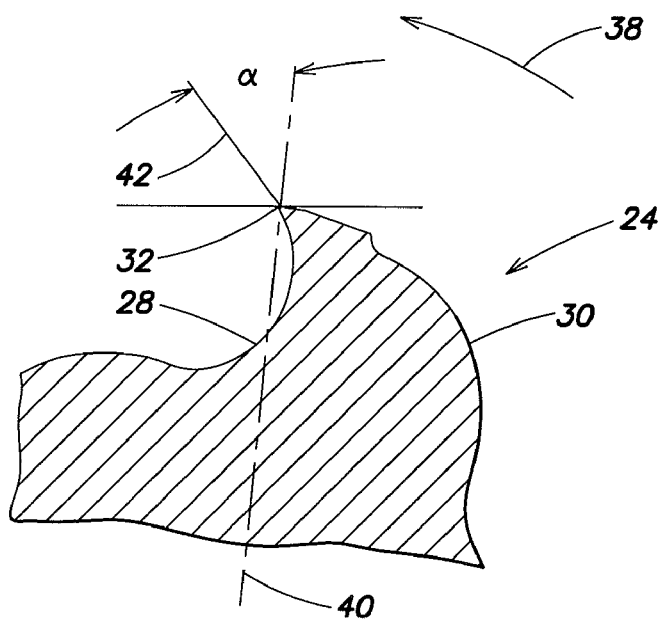
FIG. 3 is a diagrammatic sectional view of a helical tooth with a positive rake angle.

Referring to FIGS. 2 and 3, each tooth 24 has a cutting surface 28 and a relief wall 30. The cutting surface 28 and relief wall 30 of a helical tooth, as taught in the prior art, intersect to form a helical cutting edge 32. The relief wall 30 can assume a variety of different configurations. The relief wall 30 shown in FIG. 2, for example, includes a primary section 34 that extends away from the cutting edge 32 along a straight line in a substantially circumferential direction. The relief wall 30 embodiment shown in FIG. 2 also includes a secondary relief wall section 36. In other embodiments, the relief wall 30 may extend away from the cutting edge 32 along an arcuate line (FIG. 3) in a substantially circumferential direction. The relief wall 30 may include additional sections beyond the secondary relief wall section. The present invention is not limited to any particular relief configuration.

The cutting surface of a prior art helical tooth typically extends between the cutting edge and an inflection point of the flute curvature; i.e., where the concave shape of the cutting surface of one tooth changes to the convex shape of the relief wall of the next tooth. For purposes of this description, the radial rake of the cutting edge is defined as the orientation of the cutting surface 28 relative to the cutting edge 32; e.g., the radial rake is considered to be positive if the cutting surface 28 trails the cutting edge 32 in the cutting direction 38 of the end mill 10, and is considered to be negative if the cutting surface 28 leads the cutting edge 32 in the cutting direction 38 of the end mill 10. The amount of rake (i.e., the rake angle "α") is determined by the included angle formed between a radius line 40 passing through a point on the cutting edge 32 and a line 42 tangent to the portion of the cutting surface 28 which lies in the diametrical plane and passes through the same point on the cutting edge 32. FIG. 3 diagrammatically illustrates a cutting tooth 24 having a positive rake angle, and FIG. 2 diagrammatically illustrates a cutting tooth 24 having a negative rake angle. Arrow 38 indicates the rotational direction of the end mill 10. The cutting edge 32 typically extends axially between the first and second ends 18, 20 of the fluted section 14.

Figure 11:
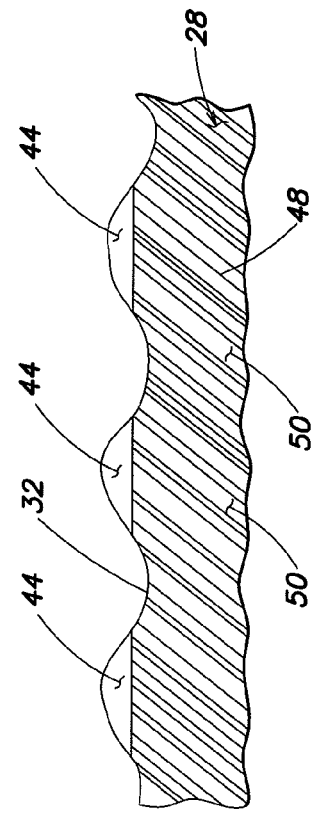
FIG. 11 is a diagrammatic illustration of a magnified view of a tooth surface adjacent a sinusoidal cutting edge, including an edge preparation.
Figure 10:
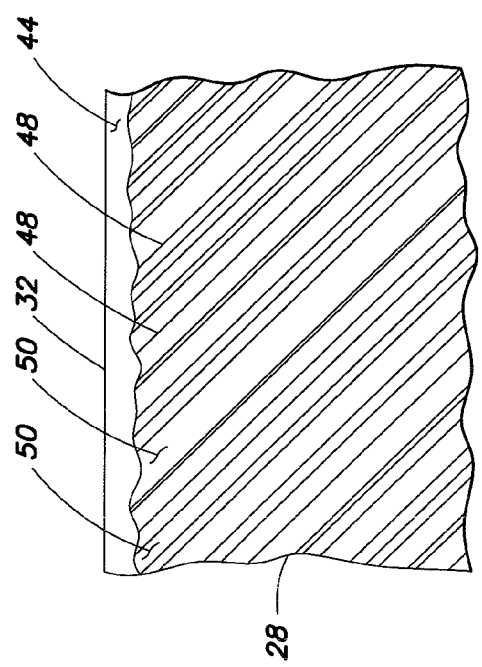
FIG. 10 is a diagrammatic illustration of a magnified view of a tooth surface adjacent a cutting edge, including an edge preparation.

The cutting edges 32 of helical teeth 24 are formed by machining (e.g., by grinding) the cutting surface 28 and the relief wall 30. The surface finish of the cutting surface 28 and the relief wall 30 is typically in the range between eight and sixteen microns (8-16 μm). FIGS. 10 and 11 diagrammatically illustrate a magnified view of a surface (e.g. cutting surface 28) having a surface finish in the range between eight and sixteen microns (8-16 μm), including peaks 48 and valleys 50 that are formed in the manufacturing process.

Referring to FIGS. 5-11, the end mill 10 includes an edge preparation 44 applied to each helical tooth 24 adjacent the cutting edge 32. An edge preparation 44 is one or more surfaces, narrow relative to the size of the tooth 24, that extend along substantially all of the helical cutting edge 32, at least one of which surfaces is disposed contiguous with the cutting edge 32. In an end mill embodiment wherein the cutting edge of a helical tooth 24 undulates along a predetermined pattern (e.g., sinusoidal), the edge preparation 44 may extend along only the peak portions of the cutting edge 32 (see FIG. 11). An edge preparation 44 may be disposed on the relief wall side of the cutting edge 32 (i.e., the edge preparation 44 surface extends between the cutting edge 32 and the relief wall 30) or on the cutting surface side of the cutting edge 32 (i.e., the edge preparation 44 surface extends between the cutting edge 32 and the cutting surface 28). The edge preparation 44 may be disposed at the same angle as the relief wall 30 or cutting surface 28 on which side it is disposed, or it may be skewed from the aforesaid relief wall or cutting surface; e.g., an edge preparation 44 disposed on the cutting surface side of cutting edge 32 may be at a different rake angle than that of the cutting surface 28. In some multiple tooth end mill embodiments, different configuration edge preparations 44 may be applied to different helical teeth; e.g., a first edge preparation configuration may be applied to a first helical tooth, and a second edge preparation configuration, different from the first, may be applied to a second helical tooth, etc. The edge preparation configuration refers to the physical characteristics of the edge preparation 44; e.g., width, orientation, number of sections, etc.

The edge preparation 44 has a uniform surface finish that is smoother than that of the cutting surface 28 or the relief wall 30. The edge preparation surface 44 is smoother than cutting surface 28 and relief wall 30 by an amount great enough so that the end mill 10 has improved performance and durability relative to an end mill 10 without an edge preparation surface 44. As an example, if the cutting surface 28 and relief wall each have a surface finish of between eight and sixteen microns (8-16 μm), then an edge preparation surface having a surface finish of about six microns (6 μ) or less will provide the end mill 10 with improved performance and durability.

The edge preparation surface 44 has a width 46 that extends perpendicular to the cutting edge 32. The width 46 may be described in terms of the chip thickness produced by an end mill 10, or the diameter of the fluted section 14 of the end mill 10. The thickness of the chips produced by an end mill 10, for example, will depend on parameters including the material of the workpiece, the feed rate per tooth, and the radial depth thickness. Based on our experience, it is preferable to have an edge preparation 44 width equal to or less than the maximum chip thickness produced by the end mill 10 under normal operating conditions. In terms of the diameter of the end mill 10, the width 46 of the edge preparation 44 is typically equal to or less than about three percent (3%) of the diameter of the fluted section 14 of the end mill 10. For those end mills 10 having a tapered fluted section 14 with a minimum diameter and a maximum diameter, the edge preparation 44 may be equal to or less than about three percent (3%) of the minimum diameter. Alternatively, the edge preparation width 46 may vary along a helical tooth; e.g., in an end mill 10 with a tapered fluted section 10, the width 46 of the edge preparation 44 may taper similarly to the diameter of the fluted section 14.

Figure 4:
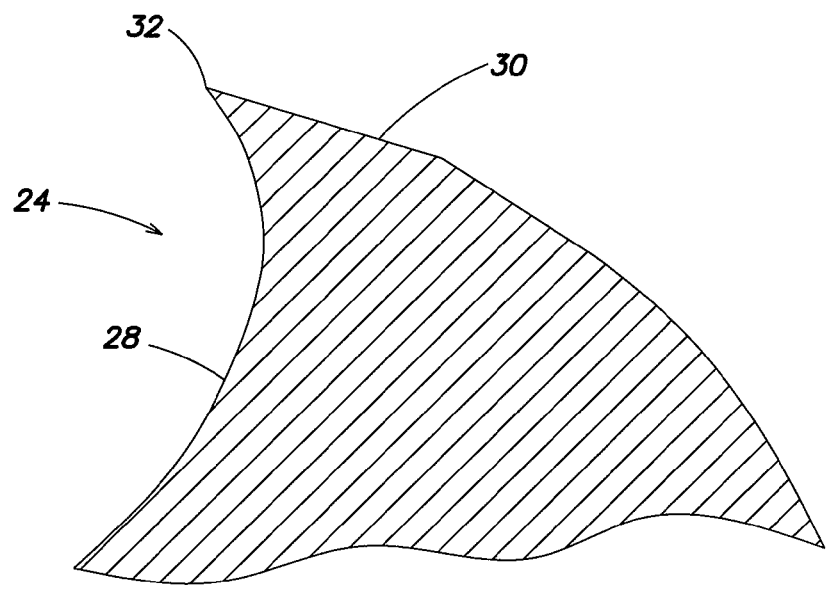
FIG. 4 is a diagrammatic sectional view of a helical tooth without an edge preparation.
Figure 5:
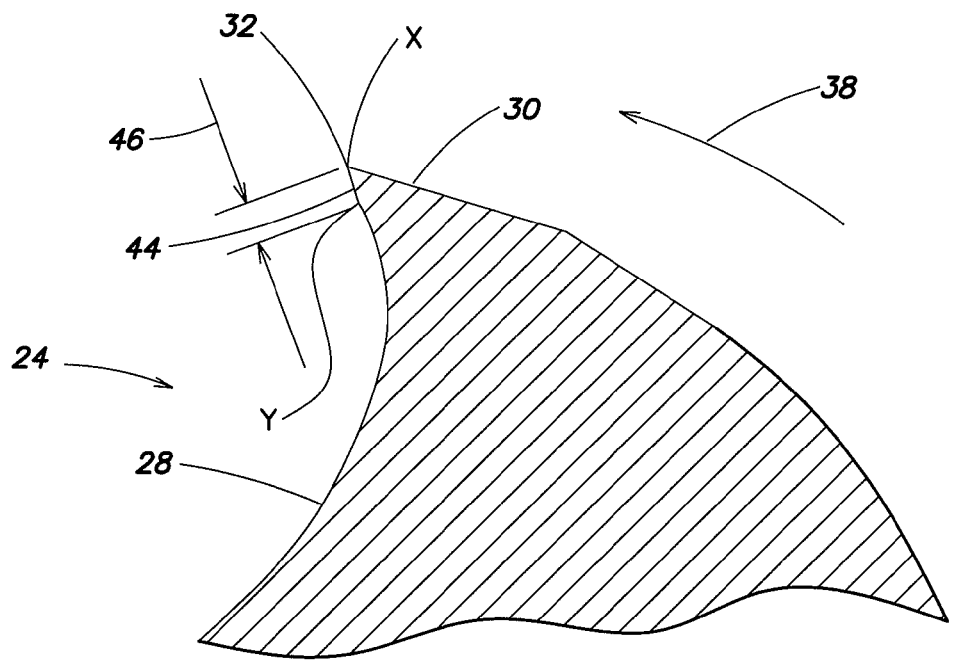
FIG. 5 is a diagrammatic sectional view of a helical tooth with an edge preparation having a positive orientation.

The edge preparation 44 may have a positive, negative, or neutral orientation relative to the cutting surface 28 and relief wall 30, or some combination thereof. FIG. 4 shows a helical tooth 24 with no edge preparation, for comparison sake. FIG. 5 illustrates a helical tooth 24 with an edge preparation 44 having a positive orientation. A positive orientation occurs when the intersection "X" between the edge preparation surface 44 and the relief wall 30 leads the intersection "Y" between the edge preparation surface 44 and the cutting surface 28 in the cutting direction 38 of the end mill 10. In the positive orientation shown in FIG. 5, the cutting edge 32 is located at the intersection X, and the edge preparation 44 is disposed on the cutting surface 28 side of the cutting edge 32.

Figure 6:
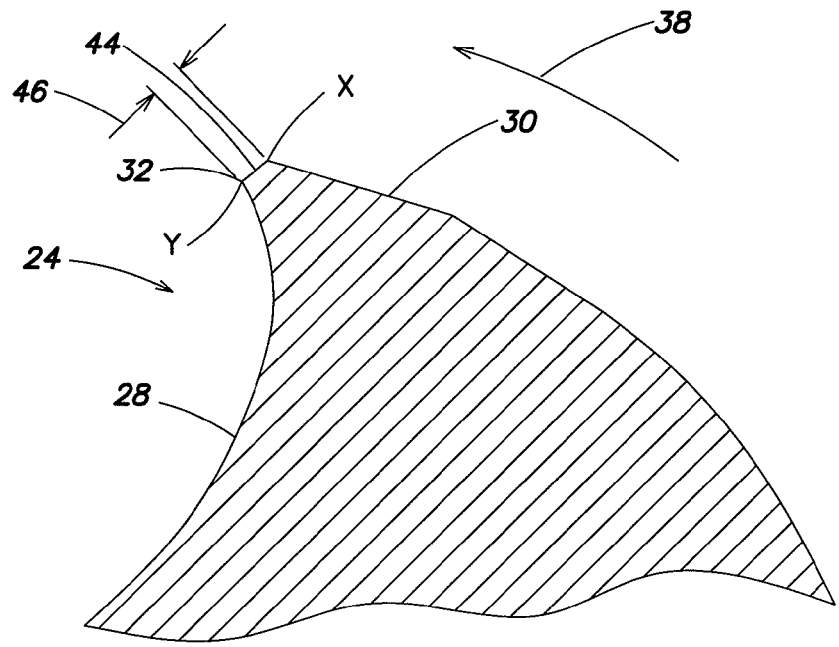
FIG. 6 is a diagrammatic sectional view of a helical tooth with an edge preparation having a negative orientation.

An edge preparation 44 with a negative orientation is shown in FIG. 6. A negative orientation occurs when the intersection "X" between the between the edge preparation surface 44 and the relief wall 30 follows the intersection "Y" between the edge preparation surface 44 and the cutting surface 28 in the cutting direction 38 of the end mill 10. In the negative orientation shown in FIG. 6, the cutting edge 32 is located at the intersection Y, and the edge preparation surface 44 is disposed on the cutting surface 28 side of the cutting edge 32. An end mill 10 having an edge preparation 44 with a negative orientation is well-suited for machining harder materials; e.g., high carbon steels, etc.

Figure 7:
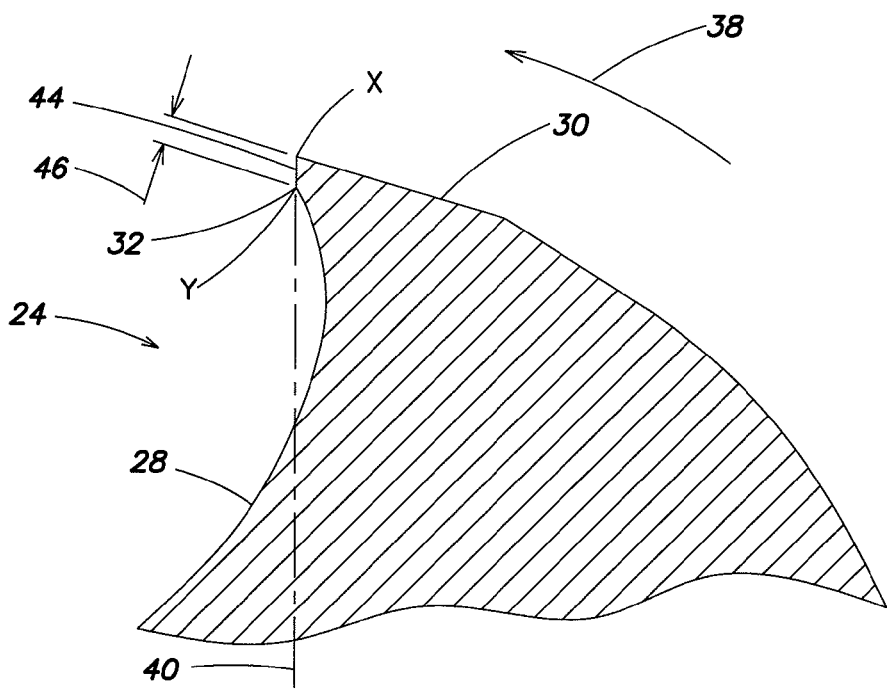
FIG. 7 is a diagrammatic sectional view of a helical tooth with an edge preparation having a neutral orientation.
Figure 8:
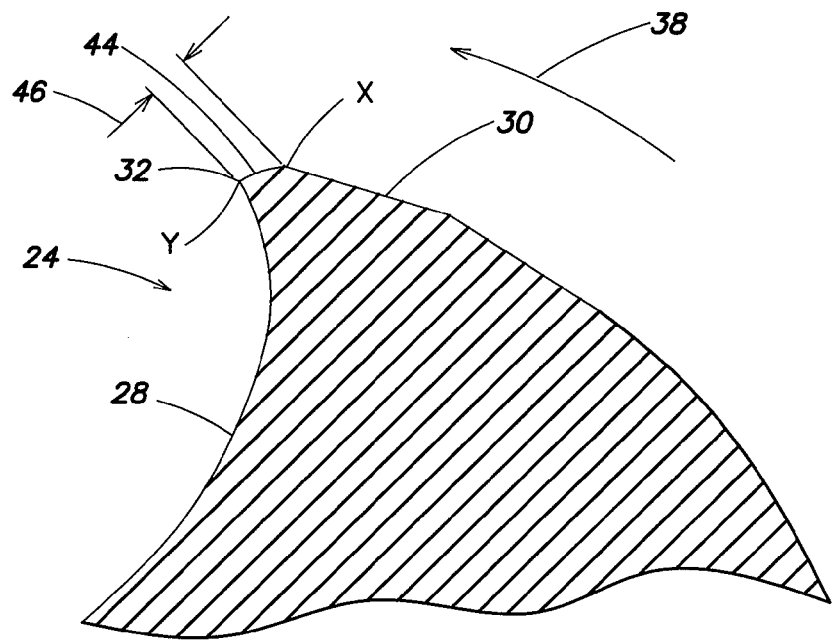
FIG. 8 is a diagrammatic sectional view of a helical tooth with an edge preparation formed to extend as an arcuate line across its width.

An edge preparation 44 having a neutral orientation is shown in FIG. 7. The neutral orientation occurs when the intersection "X" and the intersection "Y" are disposed along the same radial line 40 extending from the rotational axis 16 of the tool 10, and neither leads or follows the other. In this embodiment, the entirety of the width of the edge preparation 44 encounters the workpiece as the helical tooth engages the workpiece. The "blunted" edge created by the neutral orientation, albeit a very narrow blunted edge, helps to prevent chipping of the cutting edge 32.

The edge preparation 44 may be formed to extend as a straight line across the width 46 of the edge preparation surface 44 (see FIGS. 5-7), or the edge preparation 44 may be formed to extend as an arcuate line across the width 46 (see FIG. 8) of the edge preparation surface 44. An edge preparation 44 with a straight line width 46 may be created by grinding the tooth 24 in a direction perpendicular to the cutting edge 32. An edge preparation 44 with an arcuate line width 46 may be created by grinding a helical tooth 24 at an acute angle relative to the cutting edge 32.

Figure 9:
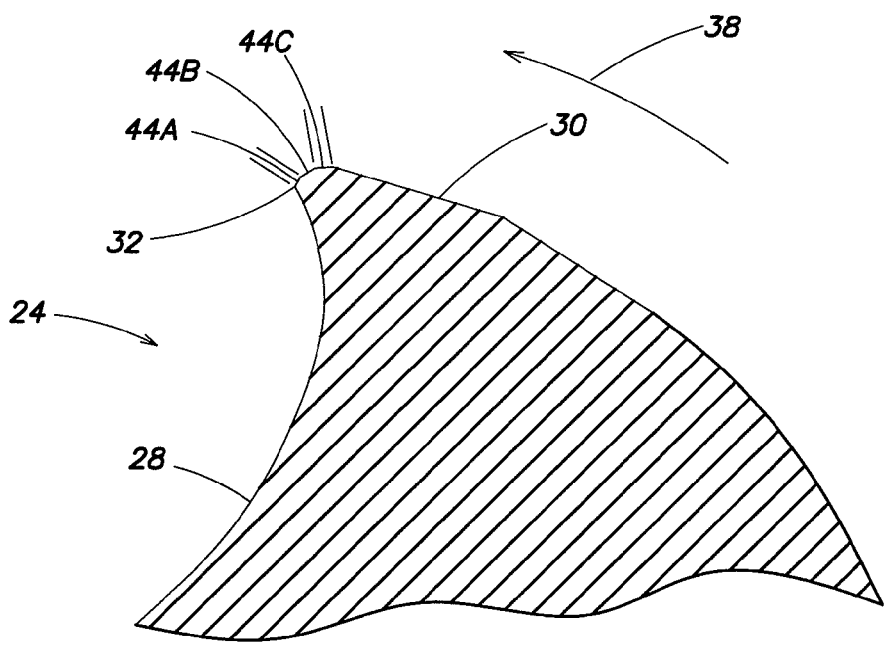
FIG. 9 is a diagrammatic sectional view of a helical tooth with an edge preparation that includes primary, secondary, and tertiary sections.

Now referring to FIG. 9, in some embodiments the end mill can include an edge preparation 44 that includes more than one section. In the embodiment shown in FIGS. 9 and 10, the edge preparation 44 includes a primary section 44A, a secondary section 44B, and a tertiary section 44C that extend substantially all of the entire helical cutting edge 32. The secondary section 44B is disposed contiguous with the primary section 44A, and the tertiary section 44C is disposed contiguous with the secondary section 44B. The primary section 44A is contiguous with the cutting edge 32. One or both of the secondary section 44B and the tertiary section 44C can be oriented to invoke desirable process dampening within the workpiece, particularly in workpieces comprised of a non-ferrous material.

Although this invention has been shown and described with respect to the detailed embodiments thereof, it will be understood by those skilled in the art that various changes in form and detail thereof may be made without departing from the spirit and the scope of the invention.

What is claimed is:

1. An end mill having an axis of rotation, comprising:
   a shank section extending along the axis of rotation;
   a fluted section extending along the axis of rotation, having a first end integrally attached to the shank section, a second end, and a diameter; and
   a plurality of helical teeth disposed within the fluted section, each having a cutting edge, a relief wall, a cutting surface, and an edge preparation surface disposed contiguous with the cutting edge, and between the relief wall and the cutting surface, wherein the cutting surface is positioned relative to the cutting edge to contact a work piece chip as the chip is separating from a work piece at the cutting edge;
   wherein the relief wall has a first surface finish, the cutting surface has a second surface finish, and the edge preparation surface has a third surface finish, and the third surface finish is smoother than the first and second surface finishes;
   wherein edge preparation surface includes a primary section and a secondary section, and the primary section is contiguous with the cutting edge and the secondary section is contiguous with the primary section.

2. The end mill of claim 1, wherein one of the primary section and the secondary section has a negative orientation relative to the cutting surface and the relief wall.

3. The end mill of claim 1, wherein one of the primary section and the secondary section has a negative orientation relative to the cutting surface and the relief wall.

4. An end mill having an axis of rotation, comprising:
   a shank section extending along the axis of rotation;
   a fluted section extending along the axis of rotation, having a first end integrally attached to the shank section, a second end, and a diameter; and
   a plurality of helical teeth disposed within the fluted section, each having a cutting edge, a relief wall, a cutting surface, and an edge preparation surface disposed contiguous with the cutting edge, and between the relief wall and the cutting surface, wherein the cutting surface is positioned relative to the cutting edge to contact a work piece chip as the chip is separating from a work piece at the cutting edge;
   wherein the relief wall has a first surface finish, the cutting surface has a second surface finish, and the edge preparation surface has a third surface finish, and the third surface finish is smoother than the first and second surface finishes;
   wherein the edge preparation surface has at least one section having a positive orientation relative to the cutting surface and the relief wall.

5. The end mill of claim 4, wherein the first and second surface finishes are equal to or greater than eight microns.

6. The end mill of claim 5, wherein the third surface finish is equal to or less than six microns.

7. The end mill of claim 4, wherein the edge preparation surface has a width, and the edge preparation surface extends along a straight line across the width.

8. The end mill of claim 4, wherein the edge preparation surface has a width, and the edge preparation surface extends along an arcuate line across the width.

9. The end mill of claim 4, wherein the edge preparation surface has a width, and the width is equal to or less than about three percent of the diameter of the fluted section of the end mill.

10. The end mill of claim 4, wherein the helical teeth extend lengthwise substantially between the first end and the second end of the fluted section, and the edge preparation surface of each helical tooth has a width that is substantially constant along the length of the helical tooth.

11. An end mill having an axis of rotation, comprising:
    a shank section extending along the axis of rotation;
    a fluted section extending along the axis of rotation, having a first end integrally attached to the shank section, a second end, and a diameter; and
    a plurality of helical teeth disposed within the fluted section, each having a cutting edge, a relief wall, a cutting surface, and an edge preparation surface disposed contiguous with the cutting edge, and between the relief wall and the cutting surface, wherein the cutting surface is positioned relative to the cutting edge to contact a work piece chip as the chip is separating from a work piece at the cutting edge;
    wherein the relief wall has a first surface finish, the cutting surface has a second surface finish, and the edge preparation surface has a third surface finish, and the third surface finish is smoother than the first and second surface finishes;
    wherein the edge preparation surface has at least one section having a neutral orientation relative to the cutting surface and the relief wall.

12. The end mill of claim 11, wherein the edge preparation surface is disposed on a cutting surface side of the cutting edge.

13. The end mill of claim 12, wherein the cutting surface is disposed at a first rake angle, and the edge preparation surface is disposed at a second rake angle that is not equal to the first rake angle.

14. The end mill of claim 11, wherein the edge preparation surface is disposed on a relief wall side of the cutting edge.

15. An end mill having an axis of rotation, comprising:
    a shank section extending along the axis of rotation;

a fluted section extending along the axis of rotation, having a first end integrally attached to the shank section, a second end, and a diameter; and a plurality of helical teeth disposed within the fluted section, each having a cutting edge, a relief wall, a cutting surface, and an edge preparation surface disposed contiguous with the cutting edge, and between the relief wall and the cutting surface, wherein the cutting surface is positioned relative to the cutting edge to contact a work piece chip as the chip is separating from a work piece at the cutting edge;

wherein the relief wall has a first surface finish, the cutting surface has a second surface finish, and the edge preparation surface has a third surface finish, and the third surface finish is smoother than the first and second surface finishes;

wherein the helical teeth extend lengthwise substantially between the first end and the second end of the fluted section, and the edge preparation surface of at least one helical tooth has a width that varies along the length of that helical tooth.

16. An end mill having an axis of rotation, comprising:

a shank section extending along the axis of rotation;

a fluted section extending along the axis of rotation, having a first end integrally attached to the shank section, a second end, and a diameter; and a plurality of helical teeth disposed within the fluted section, each having a cutting edge, a relief wall, a cutting surface, and an edge preparation surface disposed contiguous with the cutting edge, and between the relief wall and the cutting surface, wherein the cutting surface is positioned relative to the cutting edge to contact a work piece chip as the chip is separating from a work piece at the cutting edge;

wherein the relief wall has a first surface finish, the cutting surface has a second surface finish, and the edge preparation surface has a third surface finish, and the third surface finish is smoother than the first and second surface finishes;

wherein the edge preparation surface of a first of the plurality of helical teeth has a first configuration, and the edge preparation surface of a second of the plurality of helical teeth has a second configuration, and the first configuration is different from the second configuration.

* * * * *